United States Patent [19]

Murakami

[11] 4,347,616
[45] Aug. 31, 1982

[54] DIGITAL MULTI-LEVEL MULTI-PHASE MODULATION COMMUNICATION SYSTEM

[75] Inventor: Masatoshi Murakami, Tokyo, Japan

[73] Assignee: Nippon Electric Co., Ltd., Tokyo, Japan

[21] Appl. No.: 173,539

[22] Filed: Jul. 30, 1980

[30] Foreign Application Priority Data

Jul. 31, 1979 [JP] Japan .................................. 54-97792

[51] Int. Cl.³ ............................................ H04L 27/18
[52] U.S. Cl. ........................................ 375/20; 375/39; 375/53; 375/42; 370/20
[58] Field of Search ....................... 375/20, 39, 42, 53, 375/54, 86, 108, 112, 114, 116; 370/29, 20, 41, 100, 101, 114; 371/46, 56

[56] References Cited

U.S. PATENT DOCUMENTS 3,242,262 3/1966 Melas .................................... 375/54
3,341,776 9/1967 Doelz .................................... 375/39

Primary Examiner—Benedict V. Safourek
Assistant Examiner—Stephen Chin
Attorney, Agent, or Firm—Sughrue, Mion, Zinn, Macpeak & Seas

[57] ABSTRACT

A 16 QAM communication system is provided wherein the proper arrangement and polarity of the four pulse trains on the receive side is determined by adding frame sync bits of a specific modulating character on the send side and reordering the receive side pulse trains in dependence upon the bits appearing in selected receive side pulse trains during the frame sync slots. The relation between the receive pulse trains and the transmit pulse trains is determined by the phase ambiguity between the transmit and receive carriers. By modulating the transmit carrier to have a specific amplitude during the frame sync slot, detecting this time at the receiver, and determining the bit values in certain of the pulse trains at the same time, the phase ambiguity can be determined and the pulse trains corrected.

5 Claims, 11 Drawing Figures

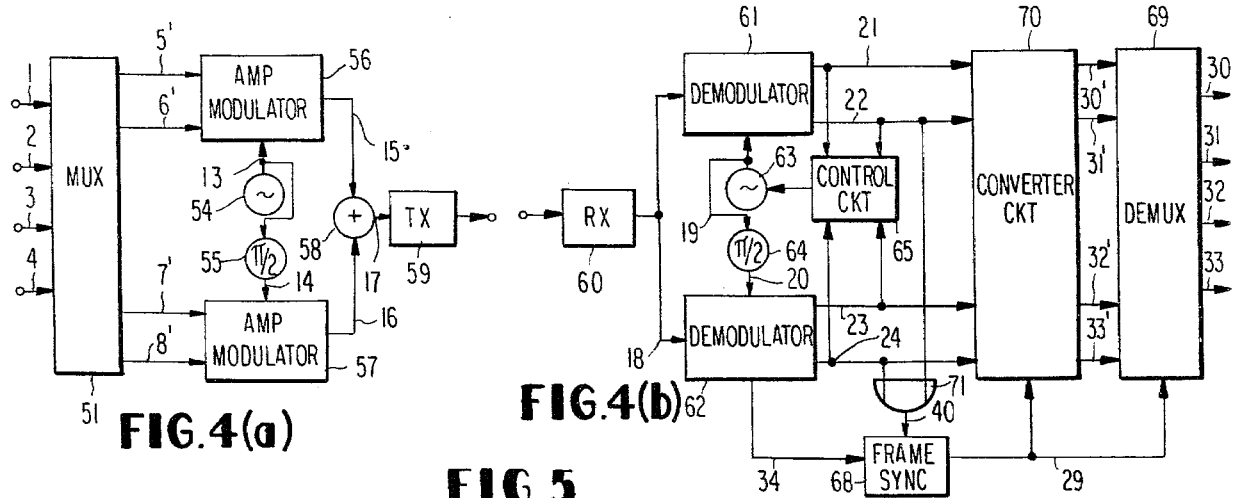
FIG.4(a)  FIG.4(b)
FIG.5
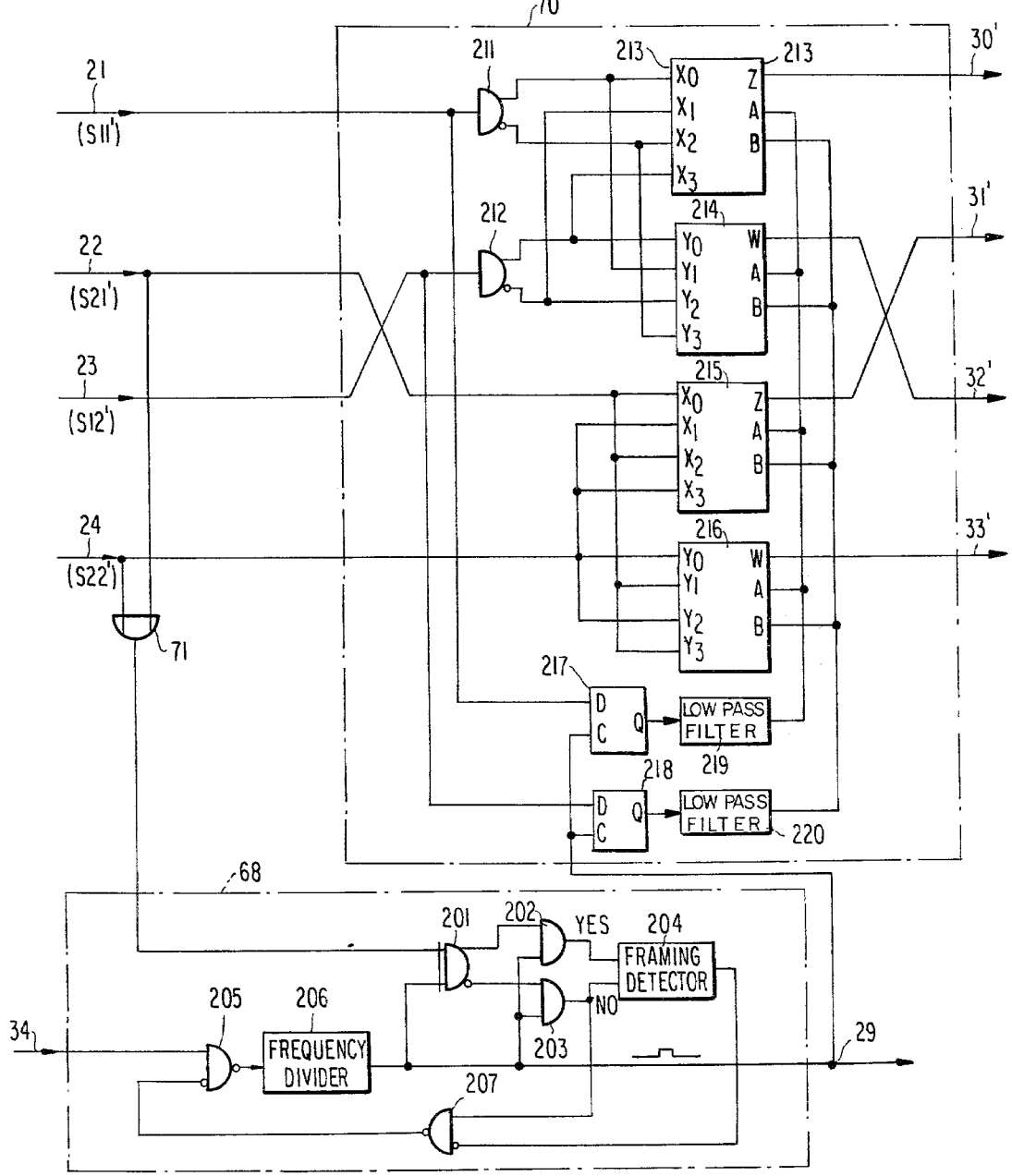

DIGITAL MULTI-LEVEL MULTI-PHASE MODULATION COMMUNICATION SYSTEM

BACKGROUND OF THE INVENTION

The present invention relates to digital multi-level multi-phase modulation communication systems.

Whereas digital multi-phase PSK modulation communication systems have been in practical use, multi-phase multi-level modulation communication systems have recently come into use to enhance the efficiency of the use of frequency bands. Among these systems, the 16 QAM communication system is most popular.

In such communication systems, differential code conversion is usually achieved so that a demodulator section requires no absolute phase of the reproduced carrier wave. However, this differential code conversion requires differential encoder circuits on the transmitting side and differential decoder circuits on the receiving side, thereby increasing constituent elements with an increase in the phase and level of the carrier wave. This method further has an inherent shortcoming that a single bit error on the transmission path is enlarged into two bit errors on the receiving side.

For details of the above described 16 QAM communication system, reference is made to:

(1) Izumi Horikawa, "Characteristics of a High Capacity 16 QAM Digital Radio System on a Multipath Fading Channel", ICC '79 Conference Record, pp. 48.4.1–48.4.6, June 10–14, 1979, and
(2) Japanese Patent Application Disclosure No. 109811/77 (wherein the technique of Reference 1 is disclosed).

SUMMARY OF THE INVENTION

The object of the present invention therefore is to provide a multi-level multi-phase modulation communication system of simple construction, which requires neither different code conversion nor absolute phase reproduction of the reproduced carrier wave on the receiving side.

In accordance with this invention, there is provided a digital multi-phase multi-level modulation communication system having a transmitter section and a receiver section. The transmitter section comprises means for multi-level multi-phase modulating a carrier wave with at least four trains of first digital signals each including a first frame signal of a pattern sequence and transmitting the modulated carrier wave. The receiver section comprises means for performing a coherent detection and multi-level decision on the modulated carrier wave to demodulate second digital signals corresponding to the first digital signals, means responsive to at least one of the second digital signals for establishing frame synchronization and providing frame timing, means responsive to the frame timing for extracting second frame signal corresponding to the first frame signal from the second digital signals, means responsive to the second frame signal and the second digital signals for changing the trains of the second digital signals and the polarities thereof to reproduce the first digital signals from the second digital signals.

BRIEF DESCRIPTION OF THE DRAWINGS

The advantages and features of the invention will be more apparent from the detailed description hereunder taken in conjunction with accompanying drawings, wherein:

FIGS. 4(a) and 4(b) respectively illustrate the block diagrams of the transmitter section and receiver section of a 16 QAM communication system in accordance with the present invention;

FIG. 5 illustrates a preferred circuit diagram of the signal converting circuit and frame synchronizing circuit of FIG. 4.

DETAILED DESCRIPTION OF THE PREFERRED EMBODIMENT

Figure 1A:
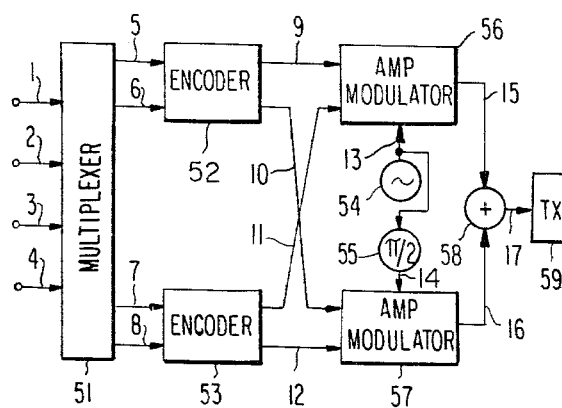
FIGS. 1(a) and 1(b) respectively illustrate the block diagrams of the transmitter section and receiver section of a conventional 16 QAM communication system.

In FIG. 1(a), four synchronized trains of two-level digital (or binary) signals 1 through 4 are supplied to a multiplexer circuit 51, wherein periodic idle time slots are newly provided in the signal trains 1 through 4 by bit rate conversion. In these idle time slots are inserted, for instance, frame signals having a predetermined pattern. These frame signals are extracted on the receiving side to establish synchronization and detect signal errors and/or equipment troubles on the transmission path.

Figure 2:
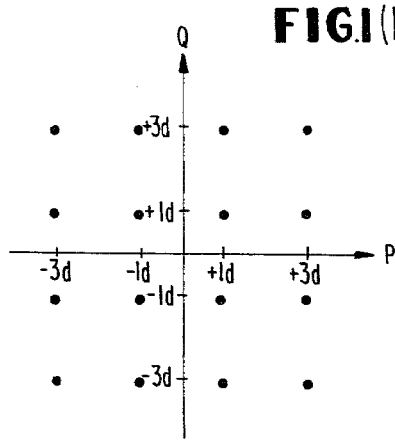
FIG. 2 is a signal vector mapping of the 16 QAM carrier wave.
Figure 3A:
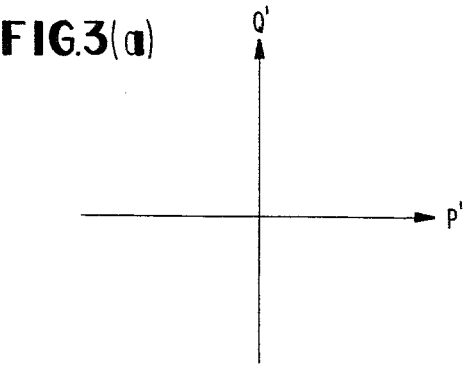
FIGS. 3(a), 3(b), 3(c) and 3(d) are vector diagrams illustrating different phases of the reproduced carrier wave in the receiver section of FIG. 1.
Figure 3B:
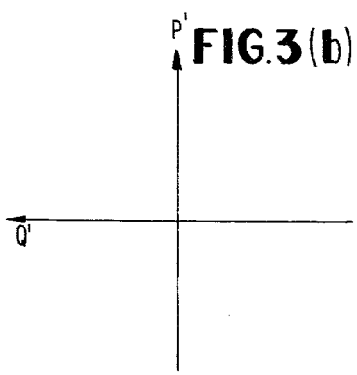
Figure 3C:
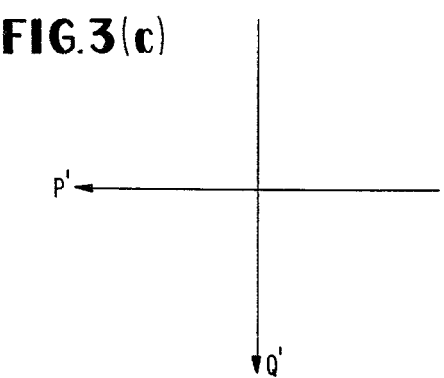
Figure 3D:
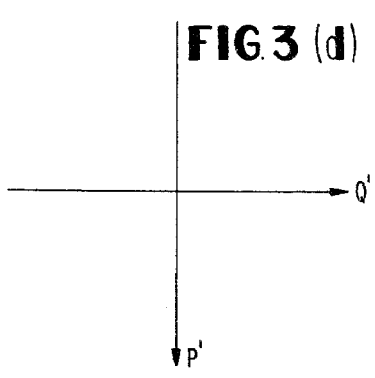

Two signal trains 5 and 6 and two signal trains 7 and 8 are supplied to summing logic converting (differential encoder) circuits 52 and 53, which provide two signal trains 9 and 10 and two signal trains 11 and 12. The first signal trains 9 and 11 and the second signal trains 10 and 12 are supplied to amplitude modulators 56 and 57, respectively, when amplitude-modulate matually orthogonal carrier waves 13 and 14, which are generated in a carrier wave generating circuit 54 and shifted by $\pi/2$ in a phase shifter 55. These mutually orthogonal modulated carrier waves 15 and 16 are synthesized in an adder circuit 58 into a 16 QAM carrier wave 17. The 16 QAM carrier wave is transmitted by way of a transmitter 59 and has 12 phases and 4 levels as shown in FIG. 2.

Figure 1B:
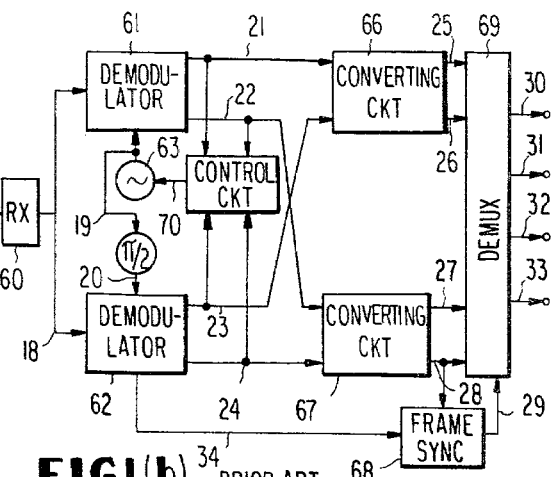

On the other hand, in FIG. 1(b) the QAM carrier wave 18 received by a receiver 60 is demodulated with mutually orthogonal reproduced carrier waves 19 and 20 into digital signal trains 21 through 24 in demodulator circuits 61 and 62, each of which is primarily composed of a coherent detector, four-level decoder (or multi-level decision circuit) and clock recovery circuit. Herein the reproduction of the carrier waves 19 and 20 from the modulated carrier wave 18 is accomplished in this manner: the demodulated two-level digital (or binary) signals 21–24 are signal-processed in a carrier wave control circuit 65 to provide a carrier wave control signal 70, with which a carrier wave recovery circuit 63 is controlled to provide the reproduced carrier wave 19 synchronized with the QAM carrier wave 18. A $\pi/2$ phase shifter circuit 14 phase-shifts the carrier wave 19 by $\pi/2$ to provide the carrier wave 20. For details on a carrier wave reproducing circuit of this kind, see Reference (1) cited above, for instance. The reproduced carrier wave 19, though synchronized with the carrier wave 13 on the transmitting side, has a phase difference of 0, $\pi/2$, $\pi$ or $3\pi/2$ from the carrier wave 13. Accordingly, the demodulated signals 21-24 do not necessarily coincide with the modulating signals 9-12 on the transmitting side. However, because of the use of the summing converting circuits 52 and 53 of FIG. 1 (a) on the transmitting side, the information of the signals 5-8 that is to be transmitted is in the phase difference between modulating time slots of the modulated carrier wave, and signal trains 25 through 28 converted by differential converting circuits 66 and 67 on the receiving side coincide with the signal sequences 5 through 8 on the transmitting side as long as the phases of reproduced carrier waves 19 and 20 are constant over time. A frame synchronizing circuit 68 establishes frame synchronization in response to the frame signals inserted in these signals 25 through 28 and the clock signal 34 from the demodulator circuit 62 to provide information 29 indicating the time slots of frame pulse inserted. A demultiplexer circuit 69 removes the frame pulse from the signals 25-28 in response to information 29 to produce signal trains 30 through 33 corresponding to the input pulses 1-4 on the transmitting side.

Next, to elucidate the principle of the present invention, the relationship between the modulating signals 9-12 on the transmitting side and demodulated signals 21-24 with reference to the phases of the reproduced carrier waves 19 and 20 on the receiving side in such a 16 QAM digital signal transmission system will be explained in detail hereunder.

For the convenience of explanation, the two-level (or binary) modulating signals 9, 11 and 10, 12 shown in FIG. 1 (a) are represented by $S_{11}$, $S_{21}$ and $S_{12}$, $S_{22}$, respectively; mutually orthogonal carrier waves 15 and 16 amplitude-modulated by these modulating signals, by P and Q, respectively; reproduced carrier waves 19 and 20 shown in FIG. 1 (b), by P' and Q', respectively; and demodulated signals 21, 22, 23, and 24, by $S_{11}'$, $S_{21}'$, $S_{12}'$ and $S_{22}'$, respectively. The relations between the amplitudes of the modulated carrier waves P and Q and the modulating signals $S_{11}$, $S_{21}$ and $S_{12}$, $S_{22}$ are charted in the following table, where d is the unit of the amplitudes of the carrier waves.

TABLE 1

| P | | | Q | | |
|---|---|---|---|---|---|
| | $S_{11}$ | $S_{21}$ | | $S_{12}$ | $S_{22}$ |
| Carrier wave amplitude | +3d | 1 | 0 | Carrier wave amplitude | +3d | 1 | 0 |
| | +1d | 1 | 1 | | +1d | 1 | 1 |
| | −1d | 0 | 1 | | −1d | 0 | 1 |
| | −3d | 0 | 0 | | −3d | 0 | 0 |

In the relations between modulating signals and modulated carrier waves charted in Table 1, the distinction between 1 and 0 of $S_{11}$ on P and $S_{12}$ on Q corresponds to the polarity of the carrier wave, and that between 0 and 1 of $S_{21}$ on P and $S_{22}$ on Q, to the relative greatness of the amplitude of the carrier wave. The 16 QAM carrier wave 17 is illustrated in FIG. 2. When signal demodulation by coherent detection is achieved in the demodulators 61 and 62 by the use of the carrier waves 19 and 20 reproduced on the receiving side from this modulated carrier wave 17 which has 16 mutually different signal vectors, if the carrier waves 19 and 20 (or P' and Q') are reproduced, as illustrated in FIG. 3 (a), in exactly identical phases with those of the carrier waves 13 and 14, respectively, on the transmitting side shown in FIG. 2, the amplitudes and polarities of the modulated carrier waves P and Q will be demodulated in exact identity with the amplitudes and polarities modulated on the transmitting side. However, if P' and Q', as illustrated in FIG. 3 (b) are reproduced in a $\pi/2$ shifted phase relation to the carrier wave on the transmitted side, signals resulting from modulation of the carrier wave Q will be demodulated by the reproduced carrier wave P', while signals resulting from modulation of the carrier wave P will be demodulated reversely in polarity by the carrier wave Q', as would be obvious from the comparison of FIG. 2 with FIG. 3 (b). Similarly, if the carrier waves are reproduced in the phases shown in FIGS. 3 (c) or (d), the same signals as those modulated on the transmitting side will not be demodulated. Comparison of FIG. 2 and FIGS. 3 (a) through (d) reveals the relations between the carrier waves on the transmitting side and the signals demodulated on the receiving side with reference to the phase differences of the reproduced carrier waves, 0, $\pi/2$, $\pi$ and $3\pi/2$, charted in Table 2.

TABLE 2

| | 0 | $\pi/2$ | $\pi$ | $3\pi/2$ |
|---|---|---|---|---|
| P' | P | Q | $\overline{P}$ | $\overline{Q}$ |
| Q' | Q | $\overline{P}$ | $\overline{Q}$ | P |

In the table above, $\overline{P}$ and $\overline{Q}$ signify demodulation of signals resulting from reversal of the polarities of the carrier waves modulated on the transmitting side, i.e. demodulation of a signal +3d into −3d or a signal +1d into −1d. These relations between P and $\overline{P}$, and between Q and $\overline{Q}$, can be represented by the following equations by the use of the paired sequences of two-level signals $S_{11}$, $S_{21}$ and $S_{12}$, $S_{22}$ in accordance with Table 1:

$$P = \{S_{11}, S_{21}\} \tag{1}$$

$$\overline{P} = \{\overline{S}_{11}, S_{21}\} \tag{2}$$

$$Q = \{S_{12}, S_{22}\} \tag{3}$$

$$\overline{Q} = \{\overline{S}_{12}, S_{22}\} \tag{4}$$

If, for example, the carrier waves P and Q are so modulated on the transmitting side as to have amplitudes of +3d each, the signals will be demodulated on the receiving side, in correspondence to Table 2, as charted in Table 3.

TABLE 3

| | 0 | $\pi/2$ | $\pi$ | $3\pi/2$ |
|---|---|---|---|---|
| P' | 3d | 3d | −3d | −3d |
| Q' | 3d | −3d | −3d | 3d |

This Table 3 can be rewritten into Table 4 below by substituting the paired two-level signals $S_{11}$, $S_{21}$ and $S_{12}$, $S_{22}$ for the values therein in accordance with Equations (1) through (4).

TABLE 4

| | 0 | $\pi/2$ | $\pi$ | $3\pi/2$ |
|---|---|---|---|---|
| P' | 10 | 10 | 00 | 00 |
| Q' | 10 | 00 | 00 | 10 |

Table 4 evidently indicates that $S_{21}'$ and $S_{22}'$, corresponding to the relative amplitudes of the carrier waves P and Q, are constant and 0 irrespective of the phases of the reproduced carrier waves P' and Q', the absolute value of the amplitudes being always 3d. Further, $S_{11}'$ and $S_{12}'$, which indicate the polarities of modulated carrier waves, are in a relationship charted in Table 5 with reference to the phases of reproduced carrier waves.

TABLE 5

|    | 0 | $\pi/2$ | $\pi$ | $3\pi/2$ |
|----|---|---------|-------|----------|
| P' | 1 | 1       | 0     | 0        |
| Q' | 1 | 0       | 0     | 1        |

The foregoing explanation has revealed that, if the carrier waves P and Q are so modulated on the transmitting side to have the same amplitude periodically, $S_{21}'$ and $S_{22}'$ indicating the amplitudes of demodulated signals can be expected to be demodulated into the same signals as those on the transmitting side regardless of the phases of reproduced carrier waves on the receiving side, and by the use of a frame synchronizing circuit it is possible to detect the periodic time slots in which the desired signals are found. Therefore, according to the polarities of the signals detected from the signals $S_{11}'$ and $S_{12}'$ of such time slots, it is possible to determine, by referring to Table 5, the phase relationship of the carrier waves on the receiving side to those on the transmitting side.

Next will be described a 16 QAM communication system in accordance with the present invention, structured on the basis of the principle elucidated above.

In FIG. 4 (a), four synchronized sequences, 1 through 4, of two-level pulse code modulated (PCM) signals, which are the signals to be transmitted like the corresponding ones in FIG. 1 (a), are supplied to a multiplexer circuit 51. In this circuit 51, new time slots are periodically provided in the signal sequences 1–4 by bit rate conversion, and as frame signals, for instance, 1 is inserted into signal sequences 5' and 7', and 0 into signal sequences 6' and 8'. These pairs of signal sequences, 5', 6' and 7', 8', are respectively entered into amplitude modulators 56 and 57 to modulate mutually orthogonal carrier waves 13 and 14 generated by a carrier wave generating circuit 54 and $\pi/2$ phase shifter circuit 55, followed by addition by a signal adder 58 and then by transmission by way of a transmitter 59.

The modulated carrier waves in this structure, both P and Q, are modulated to have the amplitude and polarity of +3d in the time slots of the frame pulse.

Referring to FIG. 4 (b) on the other hand, like in the system of prior art illustrated in FIG. 1 (b), the modulated carrier waves are received by a receiver 60, and demodulted in demodulator circuits 61 and 62 by the use of mutually orthogonal reproduced carrier waves 19 and 20 reproduced by a carrier wave control circuit 65, carrier wave generating circuit 63 and $\pi/2$ phase shifter circuit 64. Signals 21, 22 and 23, 24 thereby demodulated respectively correspond to the denominations $S_{11}'$, $S_{21}'$ and $S_{12}'$, $S_{22}'$ used in the explanation of the relationship between modulated signals on the transmitting side and demodulated signals on the receiving side with reference to the phases of the reproduced carrier waves, and the signals $S_{21}'$ and $S_{22}'$ corresponding to the amplitudes of the modulated carrier waves, or the signals 22 and 24, are supplied to an OR gate 71, whose output 40 is entered into a frame synchronizing circuit 68. In the frame synchronizing circuit 68, frame synchronization is achieved by detecting with a signal 40 the 0 pulse of $S_{22}'$ corresponding to the carrier wave amplitude 3d of the time slots of the frame pulse periodically inserted on the transmitting side. Since the signals $S_{21}'$ and $S_{22}'$ are modulated on the transmitting side periodically with +3d signals on both P and Q, the periodic frame pulse inserted on the transmitting side can be detected from either $S_{21}'$ or $S_{22}'$ irrespective of the acquisition (or locking-in) phases of the reproduced carrier waves on the receiving side. Therefore, subjecting them to OR operation by the OR gate 71 increases the probability of other signals being 1 than those in the time slots into which 0 has been inserted, resulting in a reduced frame acquisition time. By detecting and storing, in accordance with information 29 indicating the time slots of the detected frame pulse, the 1 or 0 signals in the time slots of the signals $S_{11}'$ and $S_{12}'$, or 21 and 23, and thereby finding the phase relationship between the reproduced carrier waves and the carrier waves on the transmitting side as charted in Table 5, the demodulated signals $S_{11}'$, $S_{21}'$ and $S_{12}'$, $S_{22}'$, or signals 21–24, corresponding to Table 2 and Equations (1)–(4) are subjected to polarity and sequence conversions in a signal converting circuit 70, and signals 30' through 33' indicated in FIG. 4 (b) are thereby made identical with the signals 5'–8' on the transmitting side. The frame pulse inserted on the transmitting side is removed by a demultiplexer circuit 69 on the receiving side to provide signals 30, 31, 32 and 33 corresponding to the signals 1–4. It is obviously possible, like in the system of prior art, to monitor signal errors on the line and equipment functioning by detecting frame pulse errors in the course of synchronizing the frame pulse in the frame synchronizing circuit 68.

Next will be described specific examples of the structure of the frame synchronizing circuit 68 and signal converting circuit 70 to demonstrate that the latter, in particular, can be simply composed of several ordinary digital integrated circuits (ICs) even in a 16 QAM transmission system where four two-level pulse sequences are converted.

FIG. 5 illustrates an example of the structure of the frame synchronizing circuit 68 and signal converting circuit 70. Out of demodulated signal sequences, the OR signal 40 of signals $S_{21}'$ and $S_{22}'$ corresponding to the amplitudes of carrier waves is entered into the frame synchronizing circuit 68. A frame timing pulse 29, produced by a frequency divider 206 in response to a clock signal 34, and the signal 40 are supplied to an exclusive OR gate 201, and these complementary outputs are respectively fed to AND gates 202 and 203 to generate a YES pulse and NO pulse. These YES and NO pulses are supplied to a framing detector 204 to determine whether or not frames are in synchronization. A NAND gate 207 is provided to prohibit at a NAND gate 205 input signals from being entered into the frequency divider 206 in response to the generation of a NQ pulse when the output of the framing detector 204 indicates that a frame is out of synchronization. The frame timing pulse 29, having thus synchronized the frame pulse contained in $S_{21}'$ and $S_{22}'$, is entered into the signal converting circuit 70, and causes to be extracted and stored, by the use of D type flipflops 217 and 218, the information of 1 or 0 which, indicated in Table 5, is in the frame pulse time slots of the signals $S_{11}'$ and $S_{12}'$. So that every one of the signals $S_{11}'$, $S_{21}'$, $S_{12}'$ and $S_{22}'$, which vary with the phase difference of reproduced carrier waves as indicated in Table 2 and Equations (1), (2), (3) and (4) according to the four combinations of these 1 and 0 signals, be identical with the corresponding one of $S_{11}$, $S_{21}$, $S_{12}$ and $S_{22}$ which are the signals when the phase difference is 0, i.e. modulated signals on the transmitting side, selection is achieved by the use of prearranged signals and signal selecting elements 213 through 216. Next will be described an instance, as a specific example of this selective operation, where the carrier waves on the transmitting side are modulated in a phase state illustrated in FIG. 2 and, on the receiving side, are reproduced in a phase state shifted by $\pi/2$ from that on the transmitting side as illustrated in FIG. 3 (b).

First, the relation between the modulating pulse and demodulated pulse when a modulated carrier wave is demodulated with a carrier wave reproduced in the phase state of FIG. 3 (b) will be, on the basis of the $\pi/2$ column of Table 2 and Equations (3) and (2):

$$P'=Q=(S_{12}, S_{22})$$

$$Q'=P=(\overline{S}_{11}, S_{21})$$

Since, accordingly, $S_{12}$ is demodulated for $S_{11}'$, and $S_{11}$, for $S_{12}'$, 1 and 0 are demodulated, as indicated in Table 5, in the time slots of $S_{11}'$ and $S_{12}'$ periodically modulated by $+3d$ on the transmitting side. These signals are caused by the frame timing pulse 29 to be extracted and stored by the D type flipflops 217 and 218, and respectively entered into control terminals A and B of the signal selecting elements 213, 214, 215 and 216 by way of low-pass filters 219 and 220. If, for instance, MC 10174 dual 4 to 1 multiplexers manufactured and marketed by Motorola Inc. are used as signal selecting elements for this purpose, they would be equivalent to such elements in each of which $X_1$ and $Y_1$ is linked to Z and W, respectively, according to their truth table. According to Table 2 and Equations (2) and (3), meanwhile, $\overline{S}_{12}$, $S_{22}$, $\overline{S}_{11}$ and $S_{21}$ are demodulated into the signals 21, 22, 23 and 24, respectively, so that $S_{11}$, $S_{12}$, $S_{22}$ and $S_{21}$ are connected to the $X_1$s of the signal selecting elements 213, 214, 215 and 216, respectively. As a result, $S_{11}$, $S_{21}$, $S_{12}$ and $S_{22}$ are supplied as output signals 30', 31', 32' and 33', respectively. Circuits 219 and 220 in the output signal paths of said D type flipflops are low-pass filters for preventing said selecting elements from being erroneously controlled on the signal transmission path by any signal error that may sporadically arise in the signal sequences of $S_{11}'$ and $S_{12}'$, and each can be composed of a resistor and a capacitor having a sufficiently longer time constant than the period of the frame pulse.

The foregoing description supposed that, in the circuit 51 of FIG. 4 where the input signals 1, 2, 3 and 4 are bit rate converted and frame signals are inserted into newly provided time slots, such inserted signals should be 1 for the signal sequences 5 and 7 and 0 for the signal sequences 6 and 8, and the carrier waves, both P and Q, should eventually have amlitudes of $+3d$ in these time slots. However, these inserted signals need not be fixed to all 1 or all 0, but can have any repetitive pattern, such as the PN pattern.

Thus, if signals having the same repetitive pattern are inserted into the same time slots of $S_{21}$ and $S_{22}$ in correspondence to the relative amplitudes of the carrier waves P and Q, $S_{21}'$ and $S_{22}'$ which are signals on the receiving side corresponding to the relative amplitudes of the received carrier waves will reproduce, irrespective of the acquisition phases of the reproduced carrier waves P' and Q', the same pattern as the repetitive pattern transmitted, and frame synchronization can be established by a frame synchronizing circuit (68 in FIG. 4) for identifying those insertion time slots on the receiving side. Further, if the same repetitive pattern is inserted into the transmitted signals $S_{11}$ and $S_{12}$ as well, it will obviously be possible to correctly select, exactly like in the case described above, demodulated signals which vary with the difference in acquisition phase of the reproduced carrier wave according to the relationship of identity or nonidentity of polarity between the signals $S_{11}'$, $S_{12}'$ of the time slots identified by the frame synchronizing circuit 68 on the receiving side and the transmitted signals $S_{11}$, $S_{12}$.

Figure 6:
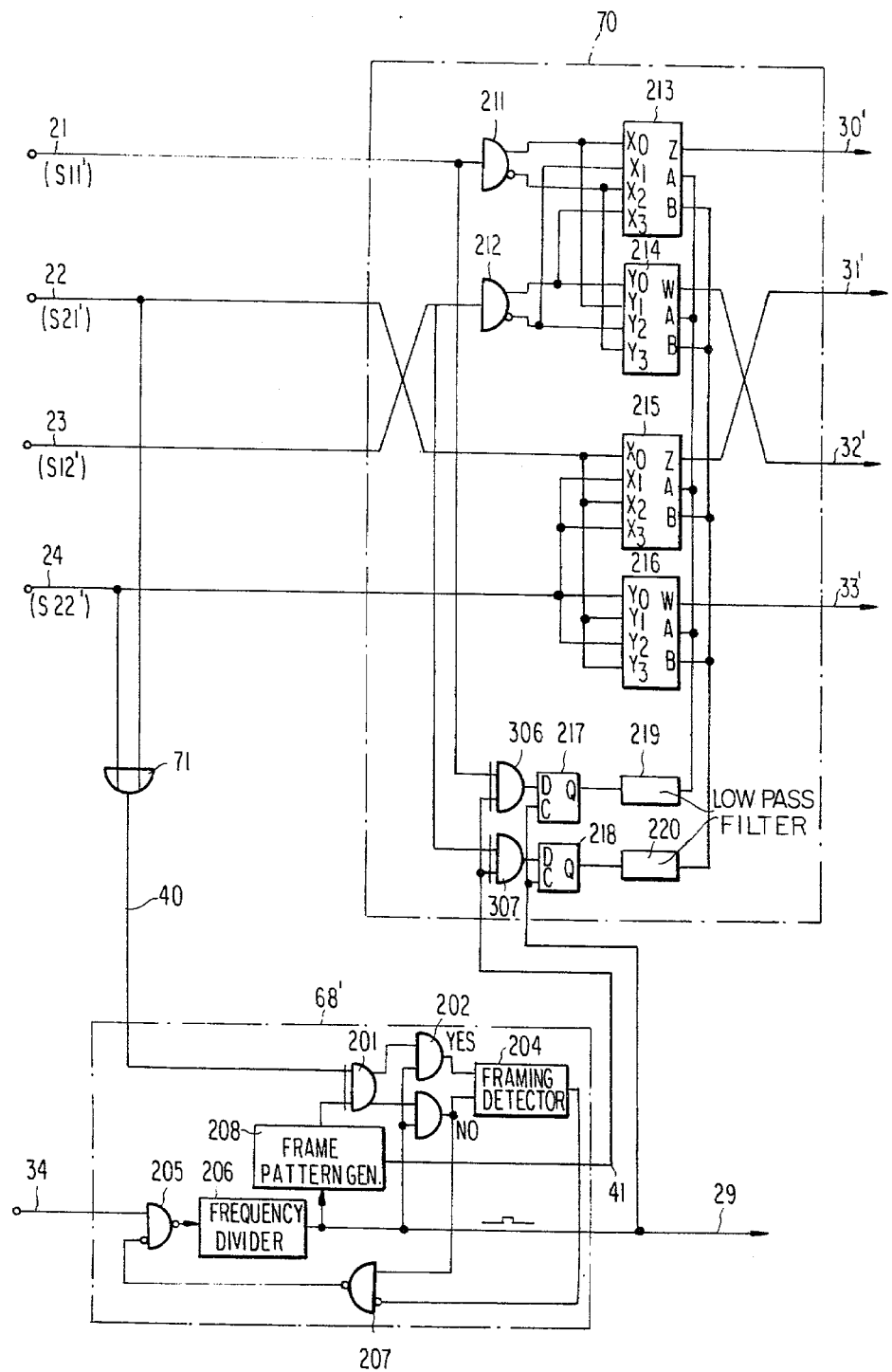
FIG. 6 illustrates another preferred circuit diagram of the signal converting circuit and frame synchronizing circuit of FIG. 4.

Giving a repetitive pattern of the combination of 1 and 0 to the pulse to be inserted would somewhat complicate the frame synchronizing circuit 68 and signal converting circuit 70 on the receiving side, as compared with the foregoing instance of all 1 or all 0 insertion, and the circuits to be described hereunder would be additionally required as illustrated in FIG. 6.

Thus is added to the structure shown in FIG. 5 a pattern generator circuit 208 which generates, in response to a frame timing pulse from the frequency divider 206 in a frame synchronizing circuit 68', respectively the same patterns as those inserted into the four signal sequences $S_{11}$, $S_{21}$ and $S_{12}$, $S_{22}$ on the transmitting side, and frame synchronization can be established in the same manner as illustrated in FIG. 5 by detecting, by means of the exclusive OR gate 201 and AND circuits 202 and 203, identity (YES) or non-identity (NO) between signals having the pattern corresponding to the amplitudes of the carrier waves P and Q, inserted into $S_{21}$ and $S_{22}$ out of the outputs of said pattern generating circuit 208, and the OR signal of $S_{21}'$ and $S_{22}'$.

Further the signal 41 having the same pattern as that inserted into the signals $S_{11}$ and $S_{12}$ on the transmitting side and the corresponding one of the demodulated signals $S_{11}'$ and $S_{12}'$ are subjected to exclusive OR operation by a newly added exclusive OR circuit 306 or 307, whose output is caused by the output signal of the frequency divider 206 to undergo, in exactly the same manner as in the case of FIG. 5, extraction and storage of identity or non-identity information by the D type flipflop 217 or 218.

As hitherto described, the present invention can completely dispense with the summing logic circuits on the transmitting side which previously required in QAM communication systems, and permits the difference logic circuits on the receiving side to be replaced by signal selecting circuits that can be composed of several ordinary logic ICs each, resulting in substantial simplification of the construction. It further makes possible the realization of a digital signal transmission system which is not susceptible to the otherwise inevitable increase in signal errors on the transmission path resulting from the differential logic conversions.

Although said detailed description of the invention referred to a 16 QAM system as a specific example, the invention, as is obvious from the foregoing description, not only is applicable to 16 QAM systems but also permits, in any modulation system where the reproduced carrier wave has a plurality of amplitude levels for a single phase and demodulated signals corresponding to the amplitude information of the carrier wave remain invariable irrespective of the phase of the carrier wave reproduced, frame synchronization to be established in accordance with signals corresponding to the demodulated signals. It is therefore obvious that the phase relationship of the reproduced carrier wave to the carrier wave on the transmitting side can be determined according to the demodulated signals in the time slots of the frame pulse and the modulating signals on the transmitting can be correctly demodulated as a result.

What is claimed is:

1. A digital multi-phase multi-level modulation communication system having a transmitter section and a receiver section, wherein said transmitter section comprises means for multi-phase multi-level modulating a carrier wave with at least four trains of first digital signals each including a first frame signal of a predetermined pattern and for transmitting the modulated carrier wave, and wherein said receiver section comprises means for performing coherent detection and multi-level decision on said modulated carrier wave to provide second digital signals corresponding to said first digital signals, means responsive to at least one of said second digital signals for establishing frame synchronization and providing frame timing, means responsive to said frame timing for extracting second frame signal corresponding to said first frame signal from said second digital signals, and means responsive to said second frame signal and said second digital signals for changing the trains of said second digital signals and the polarities thereof to reproduce said first digital signals from said second digital signals.

2. A digital multi-phase multi-level modulation communication system having a transmitter and a receiver section, wherein said transmitter section comprises: means for changing the bit rate of at least four trains of first digital signals to provide periodic idle time slots and inserting into the idle time slots second digital signals of a predetermined pattern; and means for multi-phase multi-level modulating a carrier wave with said first and second digital signals to provide first and second modulated wave, respectively, and wherein said receiver section comprises: means for performing coherent detection and multi-level decision on said first and second modulated waves to provide third and fourth digital signals corresponding to said first and second digital signals, respectively; means responsive to at least one of said fourth digital signals for establishing frame synchronization and providing frame timing; means responsive to said frame timing for extracting said fourth digital signals; means responsive to said third and fourth digital signals for changing the trains of said third digital signals and the polarities thereof to provide fifth and sixth digital signals corresponding to said third and fourth digital signals, respectively; and means responsive to said fifth and sixth digital signals for changing the bit rate thereof to reproduce said first digital signals.

3. A 16 QAM communication system comprising;

first multiplexer means for receiving four input pulse trains and providing first, second, third and fourth corresponding output pulse trains having added thereto periodic frame sync pulses, the values of which are predetermined, a first modulating means for amplitude modulating a first carrier wave with an amplitude controlled by the combination of the bit values of the first and second pulse trains from said multiplexer means, a second modulating means for amplitude modulating a second carrier wave, equal to but shifted $\pi/2$ relative to said first carrier wave, with an amplitude controlled by the combination of the bit value of the third and fourth pulse trains from said multiplexer means, and means for combining said first and second modulated carriercarrier waves to provide a transmitted carrier wave, said predetermined values of said frame sync pulses being such that during the frame sync slot said first and second carrier waves are modulated to the maximum amplitude level and the same phase as each other.

4. A system as claimed in claim 3 further comprising;

means for performing coherent detection and multi-level demodulation on said transmitted carrier wave to provide first through fourth demodulated pulse trains, means responsive to at least one of said first through fourth demodulated pulse trains for detecting the frame sync time slots in said demodulated pulse trains, means responsive to said frame sync detecting means for determining the bit pattern, during said frame sync time slot, of others of said first through fourth demodulated pulse trains, and converter circuit means for selectively exchanging said demodulated pulse trains and polarity inverting said demodulated pulse trains in dependence upon said determined bit pattern to result in four output pulse trains corresponding to said four input pulse trains.

5. A system as claimed in claim 4 wherein said predetermined frame sync bits are selected so that the frame sync bits in said second and fourth demodulated pulse trains will correspond to the frame sync bits in said second and fourth modulating pulse trains irrespective of the phrase ambiguity between the transmitter and receiver, and wherein said means for detecting is responsive to the second and fourth pulse trains, and said means for determining determines the bit pattern during the frame sync slot of said first and third demodulated pulse trains.

* * * * *

UNITED STATES PATENT AND TRADEMARK OFFICE
CERTIFICATE OF CORRECTION

PATENT NO. : 4,347,616
DATED : August 31, 1982
INVENTOR(S) : Murakami

It is certified that error appears in the above—identified patent and that said Letters Patent is hereby corrected as shown below:

Col. 1, line 40, change "different" to --differential--.

Col. 2, line 28, change "In" to --Into--;

line 40, change "when" to --which--; same line, change "matually" to --mutually--.

Col. 10, line 17, change "carriercarrier" to --carrier--.

Signed and Sealed this

Sixteenth Day of November 1982

[SEAL]

Attest:

GERALD J. MOSSINGHOFF

Attesting Officer    Commissioner of Patents and Trademarks